E. H. KESKE.
VAGINAL SYRINGE.
APPLICATION FILED NOV. 16, 1908.

939,266.

Patented Nov. 9, 1909.

Witnesses:
Edward Schorr.
W. P. Schulz.

Ernst H. Keske, Inventor
By his Attorney Arthur E. Jumper

UNITED STATES PATENT OFFICE.

ERNST H. KESKE, OF HOBOKEN, NEW JERSEY.

VAGINAL SYRINGE.

939,266.  Specification of Letters Patent.  Patented Nov. 9, 1909.

Application filed November 16, 1908. Serial No. 462,814.

*To all whom it may concern:*

Be it known that I, ERNST H. KESKE, a citizen of Germany, residing at Hoboken, Hudson county, State of New Jersey, have invented new and useful Improvements in Vaginal Syringes, of which the following is a specification.

This invention relates to a vaginal syringe which is provided with a valve in close proximity to the tip or nozzle of the syringe. In this way the operator is enabled to hold the nozzle and control the flow of the water with one and the same hand, the other hand being thus entirely free. To produce this desirable result, the usual flexible water supply tube is coupled to a perforated socket which in turn carries the discharge nozzle. The socket thus interpolated between the latter and the tube is provided with a readily operable valve that regulates the flow of the water from the tube into the nozzle.

Figure 1:
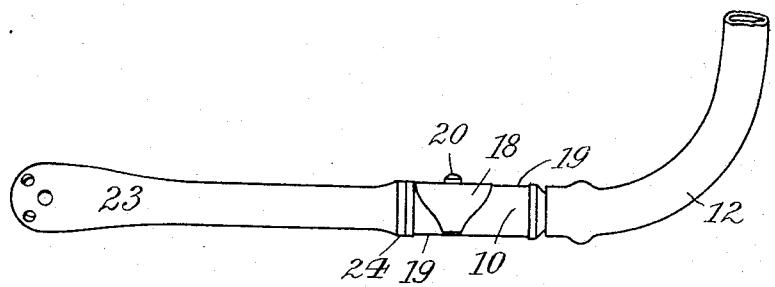
Figure 2:
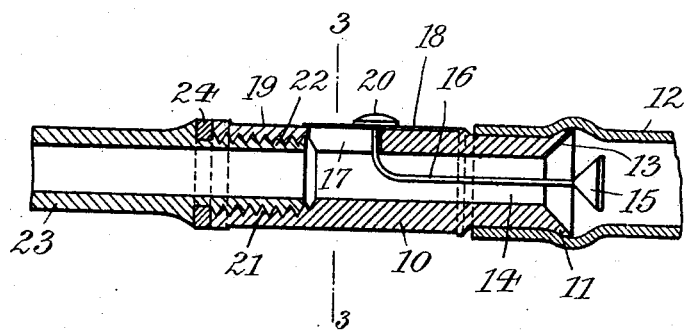
Figure 3:
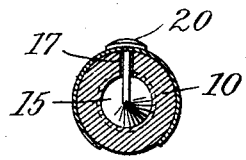

In the accompanying drawing: Figure 1 is a side view of a syringe embodying my invention; Fig. 2 a longitudinal section through the socket and adjoining parts, and Fig. 3 a cross section through the socket on line 3—3, Fig. 2.

The numeral 10 indicates a tubular or perforated socket provided with a bulged rear end 11 adapted for the engagement with a flexible tube 12, which is connected to a suitable tank or other water supply (not shown). At its rear end, socket 10 is provided with a coniform recess 13, that communicates with the bore 14 of the socket, and constitutes the seat for the conical valve 15. The latter is carried by one shank of an L-shaped stem or arm 16, the other shank of which is accommodated in a corresponding longitudinal slot 17 of socket 10. The outer end of stem 16 is secured to a curved slide 18, axially movable in a circumferential recess 19 of socket 10. Slide 18 is so bent as to snugly embrace the socket, so that any discharge of water through slot 17 is effectively prevented. If desired, slide 18 may be provided with a knob or projection 20, adapted to be readily grasped by the fingers of the operator. At its forward end, socket 10 is provided with an internal thread 21 for the engagement with the correspondingly threaded stem 22 of perforated tip 23, a washer 24 being interposed between socket and tip.

In operation, slide 18 is pushed forward to close valve 15, and tube 12 is connected to a suitable water supply. The tip is then introduced into the vagina, whereupon slide 18 is moved away from the tip to permit the flow of the water from tube 12 into and out of perforated tip 23. By properly adjusting slide 18, the volume and strength of the water jet discharged through tip 23 may be readily regulated.

It will thus be seen that with my improved syringe, the operator requires the use of one hand only for guiding the tip and controlling the water supply.

It is obvious that the socket 10 may be made integral with tip 23; that discharge nozzles of different shape and construction may be used in connection with the socket; and that the device may be used for other purposes than those stated in the above specification, without departing from the spirit of my invention.

I claim:

1. In a device of the character described, a supply tube, a slotted perforated socket adapted to be coupled thereto, a valve controlling the socket perforation, a stem secured to the valve and engaging the socket slot, a slide connected to the stem, and a discharge nozzle communicating with the socket perforation.

2. In a device of the character described, a supply tube, a slotted perforated socket adapted to be coupled to said tube, a valve controlling the socket perforation, a stem connected to the valve and engaging the socket slot, a slide embracing the socket and secured to the stem, and a discharge nozzle communicating with the socket perforation.

3. In a device of the character described, a supply tube, a slotted perforated socket adapted to be coupled to said tube, a valve controlling the socket perforation, a stem connected to the valve and engaging the socket slot, a slide embracing the socket and secured to the stem, a knob on the slide, and a discharge nozzle communicating with the socket perforation.

4. In a device of the character described, a slotted perforated socket, a slide embracing the same, a valve controlling the socket perforation, and means passing through the socket slot for connecting the slide to the valve.

5. In a device of the character described, a slotted perforated socket, a slide embracing the same, a valve controlling the socket perforation, and a stem engaging the socket slot and connecting the slide to the valve.

6. In a device of the character described, a slotted perforated socket having a circumferential recess, a slide engaging said recess, a valve controlling the socket perforation, and a stem engaging the socket slot and connecting the slide and valve.

Signed by me at New York, this 14th day of November 1908.

ERNST H. KESKE.

Witnesses:
ARTHUR E. ZUMPE,
W. R. SCHULZ.